F. W. GERDING.
BORING MACHINE.
APPLICATION FILED APR. 14, 1913.
1,074,112.
Patented Sept. 30, 1913.
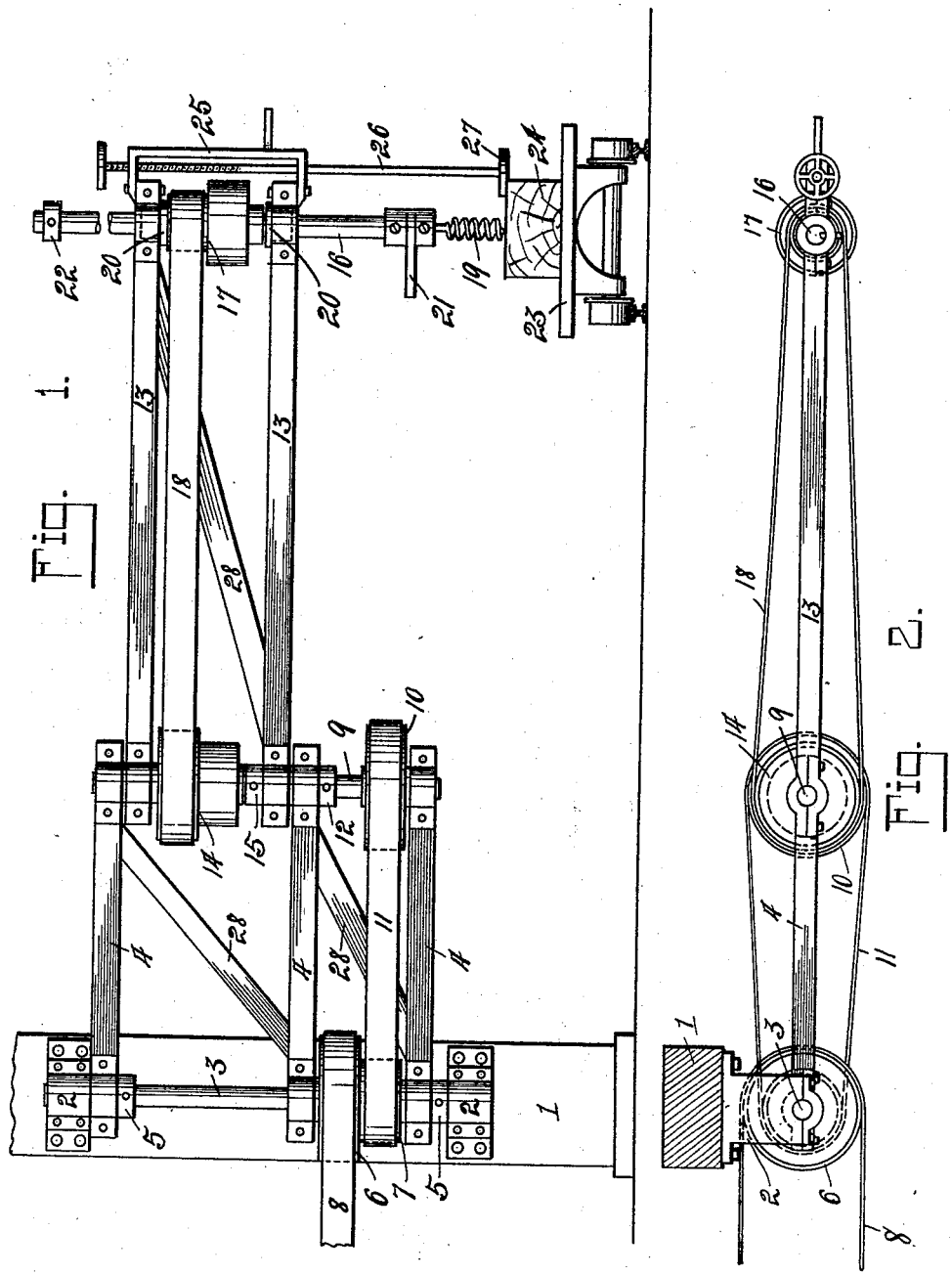

UNITED STATES PATENT OFFICE.

FREDERICK W. GERDING, OF GLANDORF, OHIO.

BORING-MACHINE.

1,074,112.  Specification of Letters Patent.  Patented Sept. 30, 1913.

Application filed April 14, 1913. Serial No. 761,029.

*To all whom it may concern:*

Be it known that I, FREDERICK W. GERDING, a citizen of the United States, and a resident of Glandorf, in the county of Putnam and State of Ohio, have invented a certain new and useful Boring-Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to boring machines, and particularly to those adapted for the boring of heavy timbers, such, for instance, as the frame-work timbers of barns, or the like, but is not restricted to such use as it may be used in any connection for which it may be adapted or appropriate.

The object of my invention is the provision of an improved machine of this class, which is simple and efficient in its construction, easy to handle, and adapted to have its auger or boring tool movable within a wide range of adjustment both circularly and radially of a central point.

Further objects of the invention will be apparent from the following detailed description.

The invention is fully described in the following specification, and while, in its broader aspect, it is capable of embodiment in numerous forms, a preferred embodiment thereof is illustrated in the accompanying drawings, in which—

Figure 1 is a side elevation, and Fig. 2 a top plan view of an apparatus embodying the invention.

Referring to the drawings, 1 designates a post or other suitable stationary object to which bearings 2, 2 are secured in vertically spaced relation. A vertical shaft 3 is journaled at its ends in these bearings and has a plurality of vertically-spaced parallel arms 4, three in the present instance, projecting horizontally therefrom for free swinging movements with such shaft as their common axis. Collars 5, 5 are fixed to the shaft and support the upper and lower arms in proper position thereon, with the lower collar resting on the lower bearing 2 to support the shaft relative thereto. Pulleys 6 and 7 are mounted on the shaft 3 between the lower and intermediate arm 4 and serve to space such arms. These pulleys may be connected together either directly or through the shaft to cause them to rotate together, and the pulley 6 is driven from any suitable source of power by a belt 8. A vertical countershaft 9 is journaled in the outer ends of the arms 4, and fixed to this shaft between the two lower arms and resting on the lower arm is a pulley 10, which is driven from the pulley 7 by a belt 11. A collar 12 on the counter-shaft has a bearing against the under side of the intermediate arm. A pair of parallel vertically-disposed arms 13 project horizontally from the counter-shaft 9 for swinging movements relative thereto and are spaced at their inner ends, in the present instance, by stepped pulley 14 and collar 15 fixed to the shaft. The arms 13 coöperate with the arms 4 to form a jointed crane and carry a shaft 16 at their outer ends for vertical axial movements and on this shaft between said arms is feathered a stepped pulley 17, which is connected to and driven from the pulley 14 by a belt 18. The belt 18 may be shifted from one to the other of the stepped portions of the pulleys 14 and 17 as the desired speed of driving of the shaft 16 may require. The shaft 16 carries an auger bit 19 at its lower end and works through bearing collars 20 that are mounted in the respective arms 13, such collars being flanged at their inner ends, as shown. The shaft 16 has a handle part 21 projecting laterally from its lower end portion to facilitate a raising of the shaft and has its upper end provided with an adjustable collar 22 for contact with the upper arm 13 to limit the lowering movements thereof as it may be desired to gage the depth of a hole to be bored.

23 designates a car on which timbers 24 may be brought into position to be bored. A yoke 25 is pivoted to the ends of the arms 13, 13 for horizontal swinging movements relative thereto and has a rod 26 threaded for vertical movements therethrough and provided at its lower end with a foot-piece 27 for resting on the timber being bored, whereby to firmly support the outer end of the crane during a boring operation.

It will, of course, be understood that the sets of arms 4, 4, 4 and 13, 13 may be vertically braced with relation to each other by bracing strips 28 or in any other suitable manner.

My machine is particularly adapted for the boring of barn timbers or the like, which are often from 30 to 40 feet long, the timbers being brought to the machine on the car 23. The jointed crane which is formed by the arms 4 and 13 may be swung into any desired position within a predetermined circular and radial range relative to the center swinging axis to place the auger 19 in position to bore the timber as desired. The auger having been placed upon a timber in position for boring, the outer end support 26—27 is adjusted to suit the height of the work and may be swung about the crane end to enable it to be disposed at one side or the other of the crane or at the end thereof, as desired.

I wish it understood that my invention is not limited to any specific construction or arrangement of the parts except in so far as such limitations are specified in the claim.

Having thus described my invention, what I claim as new, and desire to secure by Letters Patent, is,—

In combination, a support, a horizontally swinging crane projecting from said support and comprising a plurality of sections hingedly connected for relative horizontal movements, an auger shaft carried at the outer end of the outer section for vertical axial movements relative thereto, drive means carried by said support and having connection with said auger shaft, a U-shaped yoke having its legs pivoted to upper and lower sides of the outer end of the outer crane section for horizontal swinging movements relative thereto, and a rod threaded vertically through one leg of the said yoke and guided by the other of the said legs and adapted to rest at its lower end upon the work to be bored.

In testimony whereof, I have hereunto signed my name to this specification in the presence of two subscribing witnesses.

FREDERICK W. GERDING.

Witnesses:
ALBERT H. STRAMAN,
NORA A. MEYERS.

---

Copies of this patent may be obtained for five cents each, by addressing the "Commissioner of Patents, Washington, D. C."